United States Patent [19]
Curry

[11] 3,827,718
[45] Aug. 6, 1974

[54] WHEEL CHAIR

[76] Inventor: Paul F. Curry, 1281 Middletown-Eaton Rd., Middletown, Ohio 45042

[22] Filed: May 30, 1973

[21] Appl. No.: 365,124

[52] U.S. Cl............ 280/242 WC, 188/2 F, 280/5.2, 280/43.14, 280/43.24, 280/47.38
[51] Int. Cl............................. B62b 5/04, B62b 9/02
[58] Field of Search............ 188/2 F, 29, 176, 177; 280/5.2, 5.28, DIG. 10, 29, 80, 111, 242 WC, 43.24; 16/18 B, 35 R, 44; 280/43.14, 47.38

[56] References Cited
UNITED STATES PATENTS

| | | | |
|---|---|---|---|
| 1,551,127 | 8/1925 | Whyel | 280/DIG. 10 |
| 2,123,707 | 7/1938 | Bloch | 16/18 B |
| 2,742,973 | 4/1956 | Johannesen | 280/DIG. 10 |
| 3,117,653 | 1/1964 | Altherr | 188/29 |
| 3,241,848 | 3/1966 | Flory | 280/DIG. 10 |
| 3,279,567 | 10/1966 | Kempel | 188/176 |

Primary Examiner—Leo Friaglia
Assistant Examiner—Randall A. Schrecengost
Attorney, Agent, or Firm—James W. Pearce; Roy F. Schaeperklaus

[57] ABSTRACT

A wheel chair having a main framework supported by a pair of spaced main wheels rotatably mounted adjacent a rear portion thereof, and by casters carried by a pair of spaced housings mounted adjacent opposite ends of a front portion thereof. A swinging frame is pivotally mounted on each housing. A pair of caster supports is pivotally mounted on each swinging frame on opposite sides of the pivot thereof. Casters are rotatably mounted on the caster supports to support the front portion of the wheel chair. A stop bar is mounted on each of the housings and extends transversely of the swinging frame in the path of one of the casters on the swinging frame so that if the other caster on that swinging frame moves over an edge of a step, that one of the casters engages the stop bar to arrest movement of the wheel chair.

5 Claims, 8 Drawing Figures

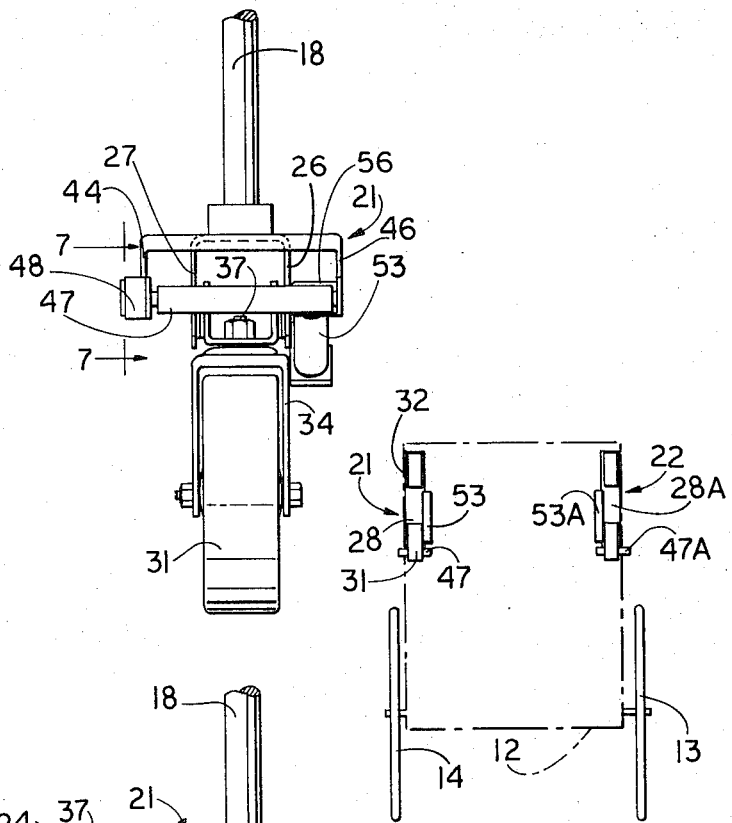
FIG. 3
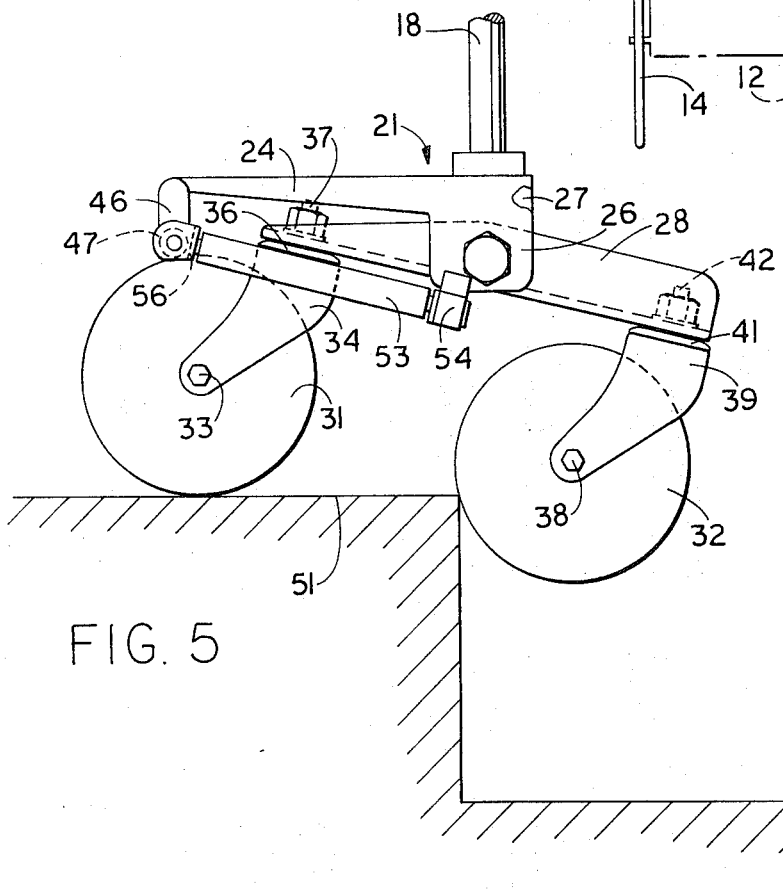
FIG. 4
FIG. 5

3,827,718

WHEEL CHAIR

This invention relates to a wheel chair. More particularly, this invention relates to an automatic braking system for a wheel chair or the like.

An object of this invention is to provide a braking arrangement for a wheel chair which automatically stops the wheel chair if the wheel chair starts to go off a step.

Briefly, this invention provides a wheel chair having a front wheel assembly which includes two casters supported on a swinging frame. If the front wheel assembly starts to go over the edge of a step, the frame swings as one caster goes over the step while the other caster is supported on the step. Tilting of the frame operates a brake to stop advance of the wheel chair. The brake can be a member carried by the main framework of the wheel chair against which the wheel on the step is urged as the frame swings. The member can be arranged to turn in a direction to permit reverse movement of the wheel chair to remove the wheel chair from the edge of the step.

The above and other objects and features of the invention will be apparent to those skilled in the art to which this invention pertains from the following detailed description and the drawings in which:

FIG. 3 is a view in rear eleavation of the front housing and swinging frame shown in FIG. 2;

FIG. 4 is a somewhat schematic view in bottom plan of the wheel chair, the framework of the wheel chair being indicated schematically in dot-dash lines;

FIG. 5 is a view in side elevation of the front housing and winging frame shown in FIG. 2 as it passes part way off of a step;

In the following detailed description and the drawings, like reference characters indicate like parts.

Figure 1:
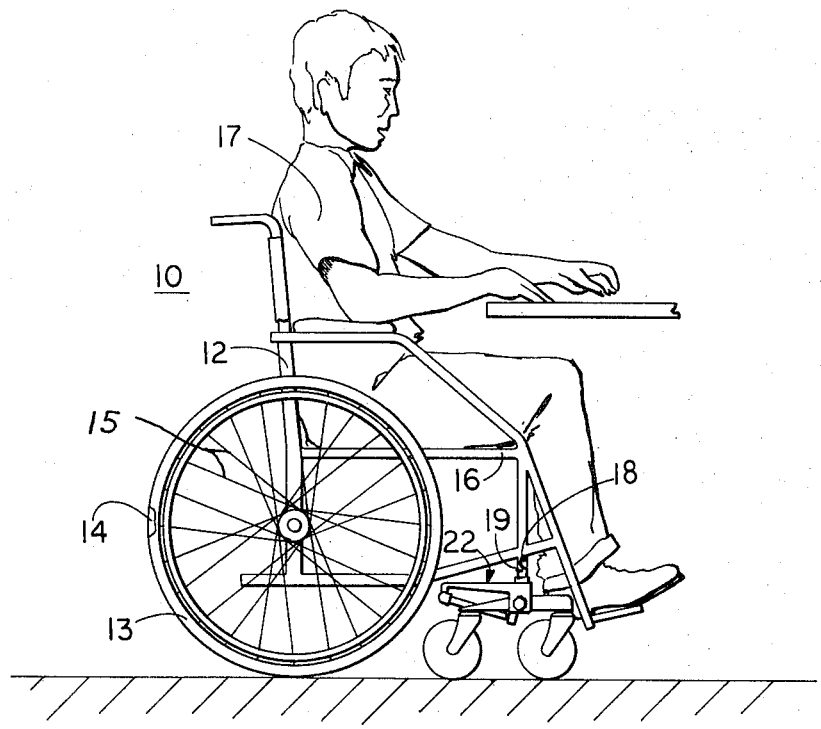
FIG. 1 is a view in side elevation of a wheel chair constructed in accordance with an embodiment of this invention.

In FIG. 1 is shown a wheel chair 10 which is constructed in accordance with an embodiment of this invention. The wheel chair 10 includes a framework 12 on which main or rear wheels 13 and 14 (FIG. 4) are rotatably mounted. The wheels 13 and 14 can be provided with spokes 15 of the usual form. An appropriate seat, not shown in detail, can span frame elements 16 (FIG. 1) to form a support for an occupant 17 of the wheel chair in usual fashion. The wheels 13 and 14 are mounted adjacent a rear portion of the framework 12.

The framework 12 includes upright frame elements 18 and 19 on which front caster supporting assemblies 21 and 22 (FIG. 4) are firmly mounted. The caster supporting assemblies 21 and 22 are similar in construction, and only the assembly 21 and associated elements will be described in detail.

Figure 2:
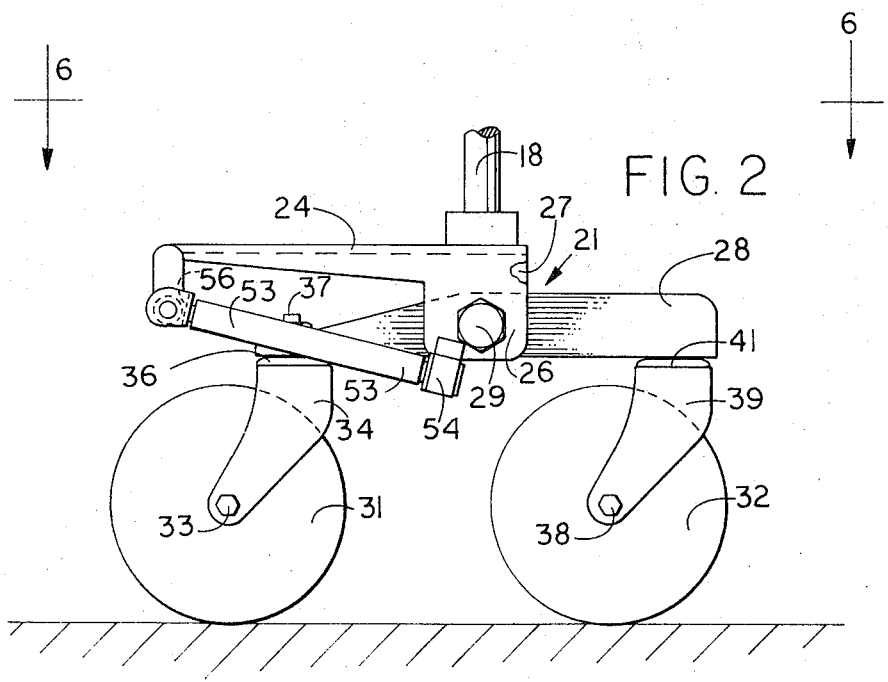
FIG. 2 is an enlarged fragmentary view in side elevation showing a front housing and a swinging frame of the wheel chair in normal position.

The assembly 21 includes a body or housing 24 (FIG. 2) which supports the frame element 18 and from which flanges 26 and 27 depend. A swinging frame 28 is pivotally mounted on a transverse pivot bolt 29, which spans the flanges 26 and 27. Casters 31 and 32 support the swinging frame 28. The caster 31 is rotatably mounted on a transverse pin 33 carried by a caster support frame 34. The caster support frame 34 is rotatably mounted below a caster bearing plate 36 attached to the swinging frame 28 by a fastener 37. The caster 32 is similarly rotatably mounted on a pin 38 carried by a caster support frame 39. The caster support frame 39 is rotatably mouned below a caster bearing plate 41 attached to the swinging frame 28 by a fastener 42 (FIG. 5).

Figure 7:
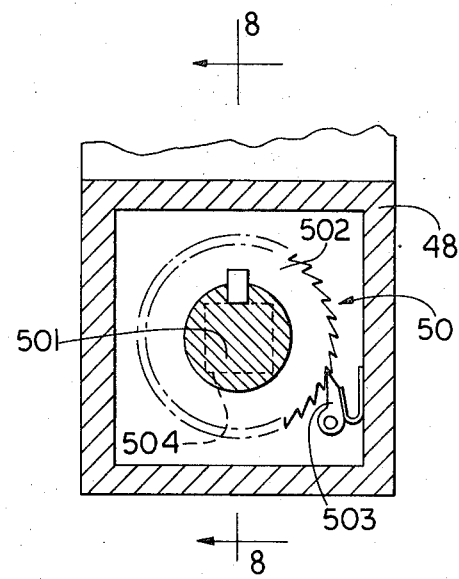
FIG. 7 is a view in section taken on an enlarged scale on the line 7—7 in FIG. 3.
Figure 8:
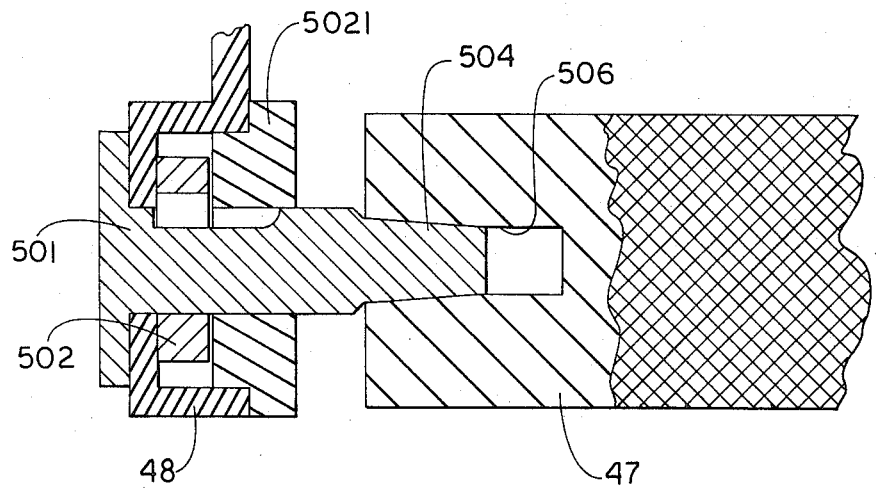
FIG. 8 is a view in section taken on the line 8—8 in FIG. 7.

At a rear end of the body 24 are spaced downwardly extending brackets 44 and 46 (FIG. 3). A stop rod 47 is rotatably mounted between the brackets 44 and 46. A ratchet housing 48 is mounted on the bracket 44. Appropriate pawl and ratchet mechanism 50 (FIG. 7) in the housing 48 permits clockwise rotation of the stop rod 47 as shown in FIG. 5 while preventing counterclockwise rotation. The pawl and ratchet mechanism 50 (FIG. 7) includes a shaft 501 rotatably mounted in the housing 48. A ratchet wheel 502 is mounted on the shaft 501 to turn therewith. An annular plug 5021 (FIG. 8) mounted in the housing 48 holds the ratchet wheel 502 in position in the housing 48. A spring pressed pawl 503 (FIG. 7) mounted in the housing 48 permits counterclockwise moving of the shaft 501 while preventing clockwise turning thereof. The shaft 501 has a square end 504 which is received in a complementary socket 506 (FIG. 8) in the stop rod 47. If the wheel chair is advanced toward a step 51, as shown in FIG. 5, so that the caster 32 passes over the edge of the step 51 while the caster 31 remains on the step, the swinging frame 28 is swung to the FIG. 5 position at which the caster 31 engages the stop rod 47. The stop rod 47 acts to prevent further rotation of the caster 31 in a direction to permit the caster 32 to proceed further off the step 51, and the wheel chair is prevented from advancing further in a direction to go off of the step 51. However, the stop rod 47 can rotate in a direction to permit reverse turning of the caster 31 to permit return of the caster 32 onto the step 51.

Figure 6:
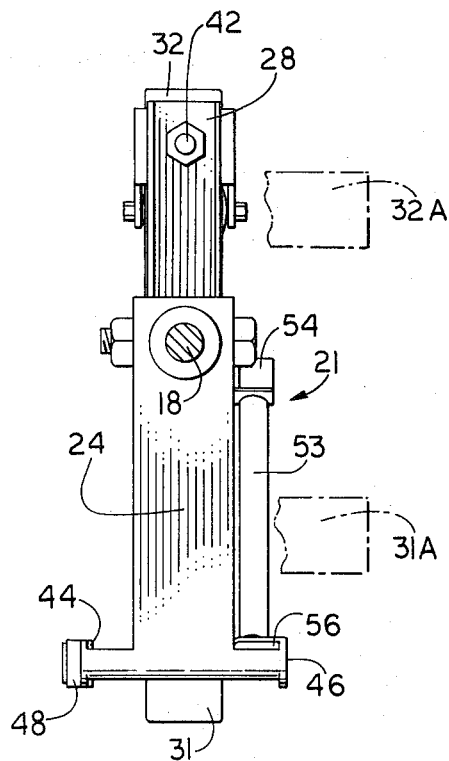
FIG. 6 is a view in section taken on the line 6—6 in FIG. 2, an alternate position of casters being shown in dot-dash lines.

Ordinarily, the wheel chair will approach a step with the caster 31 underlying the stop rod 47. However, if the wheel chair is rapidly turned, the casters can swing to the dot-dash line positions indicated at 31A and 32A in FIG. 6. The caster at the position 31A underlies a second stop rod 53. The stop rod 53 is rotatably mounted between a ratchet housing 54 (FIG. 5) and a transverse flange 56 carried by the bracket 46. The ratchet housing 54 is rigidly attached to the flange 26. An appropriate ratchet and pawl arrangement, now shown in detail, inside the ratchet housing 54 prevents rotation of the stop rod 53 in a clockwise direction as shown in FIG. 3, but permits counterclockwise rotation.

As shown in FIG. 4, the stop rod 47 extends transversely of the main framework 12 and of the swinging frame 28 of the caster supporting assembly 21 and the stop rod 53 extends lengthwise of the main framework 12 and of the swinging frame 28 inboard of the swinging frame 28. Similarly, the caster supporting assembly 22 includes a transversely extending stop rod 47A and a lengthwise extending stop rod 53A which is inboard of a swinging frame 28A thereof.

The stop rods 47 and 53 can be of strong rigid metal and the surfaces thereof can be knurled or roughened to provide non-skid surfaces against which the rear caster 32 can be advanced. The caster 31 can be formed of rubber or rubber-like material which is firmly gripped by the knurled surfaces of the stop rods.

The wheel chair construction illustrated in the drawings and described above is subject to structural modification without departing from the spirit and scope of the appended claims.

Having described my invention, what I claim as new and desire to secure by letters patent is:

1. A wheel chair which comprises a main framework, a main support wheel means rotatably mounted on the main framework adjacent a rear portion thereof, a housing mounted on the main framework adjacent a front portion thereof, a swinging frame pivotally mounted on the housing below the housing, a pair of caster supports pivotally mounted on the swinging frame on opposite sides of the pivot thereof, casters rotatably mounted on the caster supports, and a stop bar mounted on the housing in the path of one of the casters, said one of the casters engaging the stop bar when the other caster moves over the edge of a step to arrest movement of the wheel chair.

2. A wheel chair as in claim 1 wherein there is means in the housing rotatably mounting the stop rod for turning in a direction to permit rearward movement of the caster engaged thereby and means for preventing rotation of the stop rod in a direction to permit forward movement of the caster engaged thereby.

3. A wheel chair which comprises a main framework, a pair of spaced main support wheels rotatably mounted on the main framework adjacent a rear portion thereof, a pair of spaced housings mounted on the main framework adjacent opposite ends of a front portion thereof, a swinging frame pivotally mounted on each housing below the housing, a pair of caster supports pivotally mounted on the swinging frame on opposite sides of the pivot thereof, casters rotatably mounted on the caster supports, and a stop bar mounted on the housing and extending transversely of the swinging frame in the path of one of the casters, said one of the casters engaging the stop bar when the other caster moves over an edge of a step to arrest movement of the wheel chair.

4. A wheel chair as in claim 3 wherein there is a second stop rod extending lengthwise of the swinging frame inboard thereof on each housing, the second stop rod being in the path of said one of the casters when the wheel chair is turned.

5. In combination with a framework having rear wheel supports, a front support comprising a housing mounted on the framework adjacent a front portion thereof, a swinging frame pivotally mounted on the housing below the housing, a pair of caster supports pivotally mounted on the swinging frame on opposite sides of the pivot thereof, casters rotatably mounted on the caster supports, and a stop bar mounted on the housing in the path of a rear one of the casters, said rear one of the casters engaging the stop bar when the other caster moves over the edge of a step to arrest movement of the framework.

* * * * *